W. Jeffries,
Puddling Furnace,
N° 69,345. Patented Oct. 1, 1867.
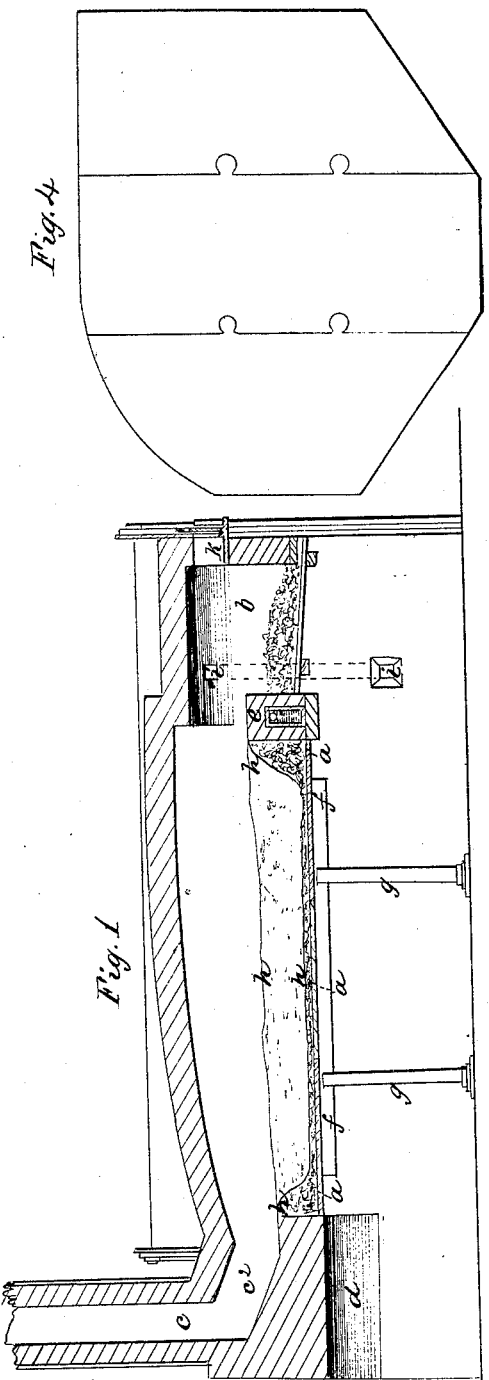
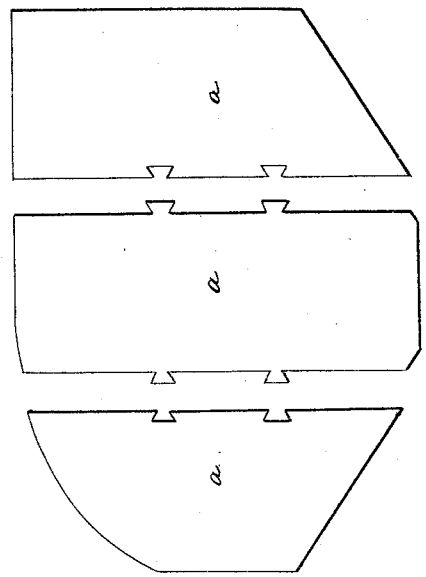
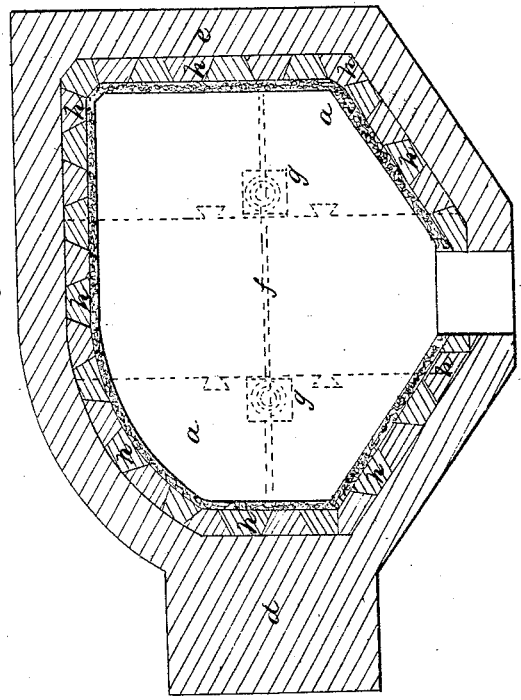
Witnesses
George Shaw
Richard Merritt
Inventor
William Jeffries

United States Patent Office.

WILLIAM JEFFRIES, OF WEST BROMWICH, ENGLAND.

Letters Patent No. 69,345, dated October 1, 1867; patented in England January 22, 1866.

IMPROVEMENT IN PUDDLING AND OTHER FURNACES.

*The Schedule referred to in these Letters Patent and making part of the same.*

TO ALL TO WHOM IT MAY CONCERN:

Be it known that I, WILLIAM JEFFRIES, of West Bromwich, in the county of Stafford, England, manager of iron-works, a subject of the Queen of Great Britain, have invented or discovered new and useful "Improvements in Puddling-Furnaces and Heating-Furnaces and other Reverberatory Furnaces used in the Manufacture of Iron and Steel, and in the Manufacture of a Fettling for Reverberatory Furnaces;" and I, the said WILLIAM JEFFRIES, do hereby declare the nature of the said invention and in what manner the same is to be performed to be particularly described and ascertained in and by the following statement thereof; that is to say—

My invention consists of the improvements hereinafter described in puddling-furnaces and heating-furnaces, and other reverberatory furnaces used in the manufacture of iron and steel, by which improvements great strength and stability are secured in the said furnaces, and the necessity for the frequent repairs required in the said furnaces, when built in the ordinary way, obviated.

I will describe my invention as applied to a puddling-furnace. I support the bed of the furnace upon arches built of brick or stone, running from end to end of the bed, that is to say, from the back of the ash-pit to the end of the furnace. The said arches are open from end to end, and the air circulates freely through them. On the said arches the bed of the furnace is supported. The said bed is made of brick or stone, and contains a series of horizontal parallel passages running from front to back, the said passages being open at both ends to the air. The passage of air through these passages keeps the bed of the furnace cool. Upon the bed of the furnace the mill-cinder or other material with which the bed is prepared is put. Upon the bed, and between it and the mill-cinder, a plate of iron may be put if preferred. Instead of supporting the bed upon arches, as described, a bottom plate of iron may be used, upon which the mill-cinder is put, the said bottom plate being supported upon pillars. By constructing the furnace in the way described the following parts, which in ordinary puddling-furnaces are made of iron and require frequent renewal, are dispensed with, that is to say, the bottom frame, the flue plates, flue bridge plates, flue jamb plates, bridge jamb plates, back wall plates, and sometimes the bottom plates. Great economy thereby results both in the cost of keeping the furnace in repair and in the saving of time consequent upon the furnace working a long time without requiring repair. The application of my improvements to other reverberatory furnaces used in the manufacture of iron and steel differs in no essential respect from their application to puddling-furnaces.

My invention consists further in manufacturing a fettling for lining or repairing puddling-furnaces and other reverberatory furnaces by casting liquid mill-cinder or other cinder in moulds, so as to form bricks or blocks of mill or other cinder.

I construct the mill or other furnace-bottom so that the said cinder can, when necessary, be tapped from the iron, and thereby leave a dry-cinder bottom. No sand is used in the mill-furnace when the cinder is to be used in carrying out my invention, and the appearance and quality of the sheets, plates, or other description of iron and steel made from the iron heated upon the said dry-cinder bottom are much improved. The said dry-cinder bottom of the mill or other furnace is kept in repair by adding to the said bottom red ore pottery mine and bull-dog, that is, calcined cinder from puddling-furnaces or other fettling material, of which the bottom is made, in a manner similar to that in which sand is added to the furnace-bottom. I do not limit myself to any particular construction of furnace-bottom, which I line or fettle, according to my invention, with blocks of mill or other cinder, as this part of my invention is applicable to all descriptions of reverberatory furnaces; but I prefer to construct the furnace-bottom and use the said blocks of mill or other cinder in the manner hereinafter described, and illustrated in the accompanying drawing.

In puddling-furnaces, the bottoms of which are lined or fettled according to my invention, the use of red ore pottery mine and bull-dog and other fettlings are dispensed with, and the yield and quality produced when the bottom is fettled with cinder blocks, is far superior to the yield and quality produced when the furnace-bottom is fettled in the ordinary way. No scraps are required in the puddling-furnace when the said cinder-bottom is used as fettling, and the quality of the tap-cinder produced from the puddling-furnace for use in the blast-furnace is equal to flue-cinder.

When there is sufficient mill-cinder no other fettling material is required, either puddling, heating, or mill or other furnace.

Having explained the nature of my invention, I will proceed to describe with reference to the accompanying drawing the manner in which the same is to be performed.

Figure 1 represents in longitudinal vertical section a puddling-furnace constructed according to my invention, and Figure 2 is a horizontal section of the bed of the same.

$a$ is the bed of the furnace, $b$ the fire-places and $c$ the chimney or stack. The chimney or stack $c$ is built upon the arch $d$, and between the said arch and bridge $e$ the bed of the furnace is supported. The said bed is made of a bottom plate, $a$, of iron, supported by the longitudinal bar $f$, the latter being carried by the pillars $g$. The position of the said bar $f$ and pillars $g$ is indicated in dotted lines in fig. 2.

The bottom-plate $a$ of the bed is made in three pieces, connected together by dove-tail junctions, as best seen in the separate view, Figure 3, which represents the separate pieces of which the bottom plate $a$ is composed.

Instead of dove-tail junctions of the form represented in fig. 3, the pieces composing the bottom plate may be joined together by dove-tail junctions of the form represented in Figure 4, that is to say, joints similar to those employed in joining together the parts of the framing of metallic bedsteads.

Although I find it convenient to make the bottom plate $a$ in three pieces, yet it may be made in one or two pieces or more than three pieces. The sides of the bottom plate $a$ are built in the side walls of the furnace, and the ends of the said plate are made to bear closely against the bridge $e$ and arch $d$, the said plate being supported in its longer direction by the bar $f$ and pillars $g$, as before explained. Upon the bottom plate $a$ of the bed I build or arrange blocks $h$ of mill-cinder or ball-furnace cinder or other fettling material with which the bed is to be prepared, and upon the said blocks I put powdered mill-cinder or ball-furnace cinder or other fettling material previous to using the furnace. The blocks of mill-cinder or ball-furnace cinder or other cinder which I employ in preparing the bed of the furnace, are made in moulds by conveying the liquid cinder from the mill or ball-furnace to the said moulds, as hereinbefore described.

In fig. 2 the cinder on the bottom plate $a$ is omitted in order to better exhibit the construction of the said plate, and the manner in which it is supported. Air for supporting the combustion of the fuel in the fire-place $b$ is supplied above the grate by means of vertical side flues, one of which is marked $i$, and the front opening $k$. The bridge $e$ is made hollow, and is kept cool by a stream of water passing through it. As the construction of the fire-place and bridge constitutes no part of the present invention I do not think a detailed description of the same necessary. The opening to the chimney $c$ is contracted by a saddle piece, $c^2$, by means of which an increased draught is obtained. By the use of the saddle piece $c^2$ the cinder is returned to the bed of the furnace.

Instead of supporting the bed upon pillars, as described, and represented in figs. 1 and 2, the bed built of brick or stone may be supported upon arches, the said arches running from the back of the ash-pit to the end of the furnace, that is the arch $d$, upon which the chimney $c$ is built, is continued to the fire-bridge $e$. When the bed is supported upon arches the said bed may have a series of horizontal parallel passages made in it, running from front to back, the said passages being open at both ends to the air. By means of the circulation of air through these passages the bed is kept cool. Upon this bed of brick or stone the blocks of mill-cinder or ball-furnace cinder or other fettling material with which the bed is to be prepared are put, or a plate of iron similar to the plate $a$, figs. 1 and 2, may be placed upon the brick or stone bed, and the blocks of mill-cinder or ball-furnace cinder built or arranged upon it in the manner described, and represented in the drawing. By constructing puddling-furnaces in the manner described and represented the bottom frame flue plates, flue bridge plates, flue jamb plates, bridge jamb plates, back wall plates, and sometimes the bottom plates are dispensed with. In ordinary furnaces the parts just enumerated require frequent renewal. By my invention a great saving, both in the cost of construction and keeping the furnace in repair, is obtained, and the necessity for the frequent repairs required in furnaces of the ordinary construction is obviated.

In applying my invention to mill, ball, and other reverberatory furnaces used in the manufacture of iron and steel, the beds of the said furnaces are constructed essentially in the manner described with reference to the bed of a puddling-furnace, the details only being varied to suit the particular furnace to which my invention is to be applied.

Having now described the nature of my invention, and the manner in which the same is to be performed, I wish it to be understood that I do not limit myself to the precise details herein described, and represented in the drawing, as the same may be varied without departing from the nature of my invention; but I claim as my invention—

1. The improvements in puddling-furnaces and heating-furnaces and other reverberatory furnaces used in the manufacture of iron and steel hereinbefore described, and illustrated in the accompanying drawing, that is to say, constructing the beds of the said furnaces substantially in the manner hereinbefore described and illustrated, whereby the whole or nearly the whole of the plates used in ordinary furnaces are dispensed with, and great economy, both in the cost of keeping the furnaces in repair and in the saving of time consequent upon the furnaces working a long time without requiring repair, is obtained.

2. Manufacturing a fettling for lining, fettling, or repairing reverberatory furnaces by tapping or running liquid mill or other cinder into moulds, so as thereby to form bricks or blocks, which bricks or blocks are used to line, fettle, or repair the bottoms of reverberatory furnaces, instead of fettling the said furnaces with red ore pottery mine and tap-cinder calcined and ground as is usual.

WILLIAM JEFFRIES. [L S.]

Witnesses:
GEORGE SHAW, 7 *Cannon Street, Birmingham.*
RICHARD SKERRETT, 7 *Cannon Street, Birmingham.*